United States Patent
Ciccarello

(10) Patent No.: US 7,862,754 B2
(45) Date of Patent: Jan. 4, 2011

(54) CASTED CONCRETE STONE WITH OPPOSED MOLDED TEXTURED SURFACES AND METHOD OF MANUFACTURE

(75) Inventor: Charles Ciccarello, St-Jean-sur-Richelieu (CA)

(73) Assignee: Techo-Bloc Inc. (CA)

( * ) Notice: Subject to any disclaimer, the term of this patent is extended or adjusted under 35 U.S.C. 154(b) by 0 days.

(21) Appl. No.: 12/338,706

(22) Filed: Dec. 18, 2008

(65) Prior Publication Data
US 2010/0055357 A1    Mar. 4, 2010

(30) Foreign Application Priority Data
Dec. 18, 2008   (CA) .................................. 2647098

(51) Int. Cl.
*B28B 3/06* (2006.01)
(52) U.S. Cl. .................. 264/71; 264/236; 264/293; 264/316; 264/333; 264/338
(58) Field of Classification Search .............. 52/311.1, 52/596; 264/236, 293, 316, 333, 338
See application file for complete search history.

(56) References Cited

U.S. PATENT DOCUMENTS

| | | | | |
|---|---|---|---|---|
| 3,427,178 A | * | 2/1969 | Shihadeh et al. | ............ 427/133 |
| 4,168,140 A | | 9/1979 | Fontana et al. | |
| 4,802,836 A | * | 2/1989 | Whissell | ...................... 425/253 |
| 5,902,528 A | * | 5/1999 | Spragg | ........................ 264/42 |
| 7,208,112 B2 | * | 4/2007 | Scherer | ...................... 264/219 |
| 2004/0104511 A1 | | 6/2004 | Griffith | |
| 2007/0216058 A1 | | 9/2007 | Carreras-Maldonado et al. | |
| 2008/0174041 A1 | * | 7/2008 | Firedman et al. | .............. 264/71 |
| 2008/0174049 A1 | | 7/2008 | Hammer et al. | |

FOREIGN PATENT DOCUMENTS

| | | |
|---|---|---|
| GB | 1585277 A | 2/1981 |
| WO | WO0153612 A1 | 7/2001 |

OTHER PUBLICATIONS

International Search Report—PCT/CA2009/001833—Mar. 9, 2010.

* cited by examiner

*Primary Examiner*—Brian E Glessner
*Assistant Examiner*—Patrick Maestri
(74) *Attorney, Agent, or Firm*—Cantor Colburn LLP

(57) ABSTRACT

A casted concrete stone having opposed parallel surfaces formed in a mold and wherein the opposed parallel surfaces have a molded textured surface. The concrete stone is fabricated by a dry-cast concrete mold wherein a profiling plate is provided with mold bottom wall formations each having a textured outer surface. A bond release film or spray or permanent coating is provided on the textured outer surface of the mold bottom wall formations. Mold forming side walls are disposed about the mold bottom wall formations. After the mold is filled with a dry-cast concrete mixture a top plate, having mold top wall formations, is disposed over the mold forming side walls with the mold top wall formations disposed inside respective ones of the molds to close the molds. Pressure and vibration is applied to compact the dry-cast concrete whereby to form a dry-cast concrete stone with opposed molded textured surfaces.

14 Claims, 4 Drawing Sheets

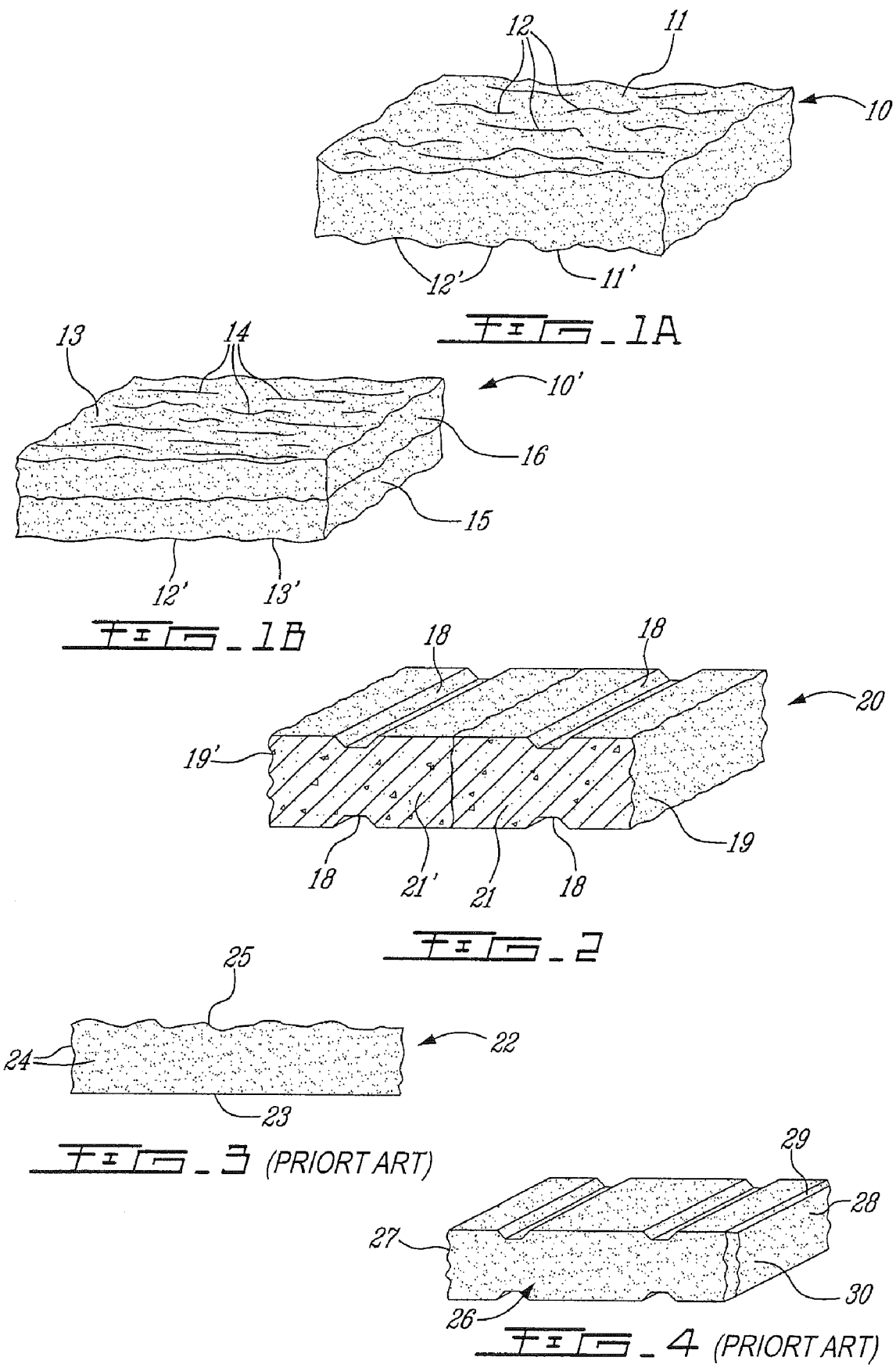

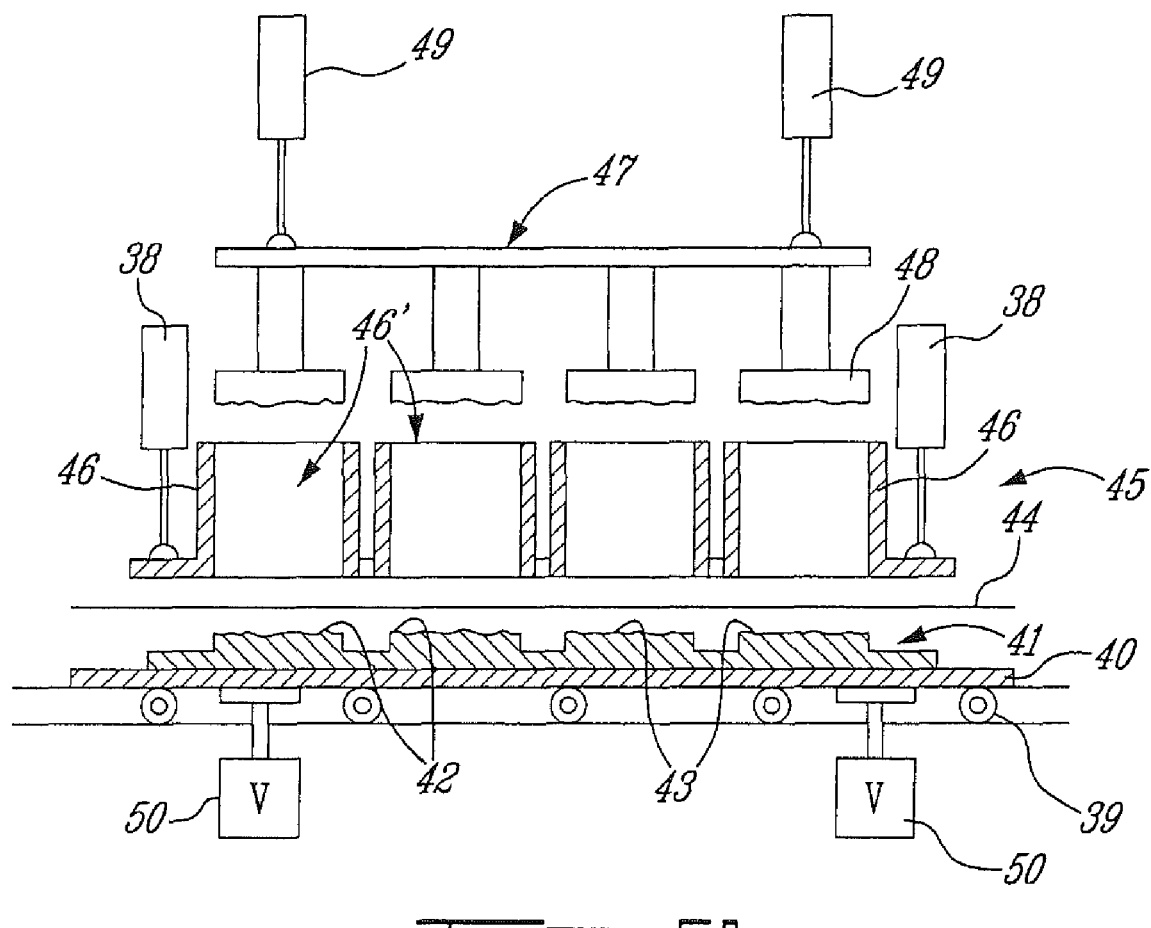
FIG_5A
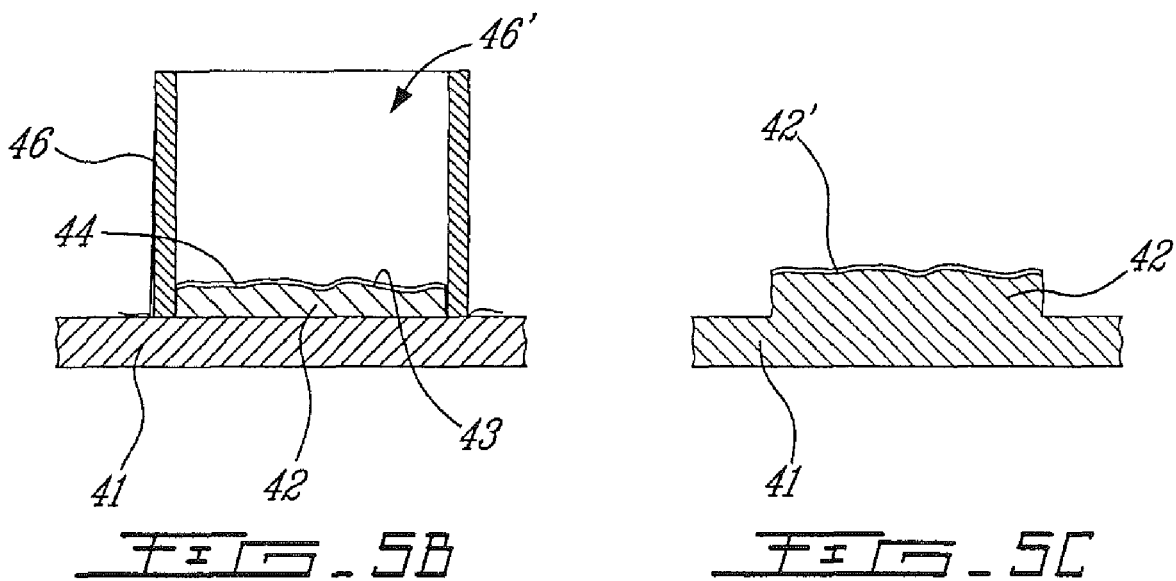
FIG_5B
FIG_5C

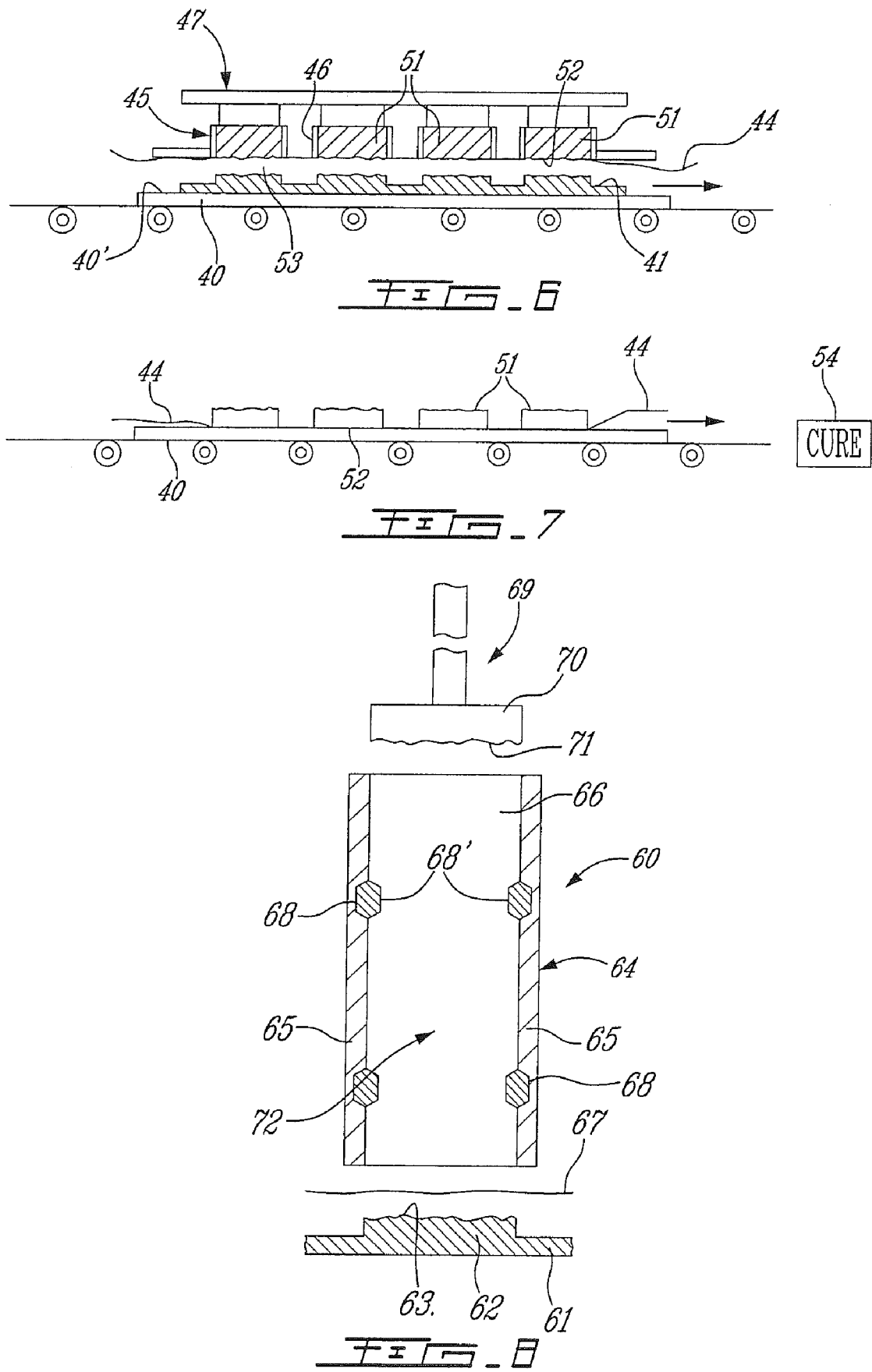

CASTED CONCRETE STONE WITH OPPOSED MOLDED TEXTURED SURFACES AND METHOD OF MANUFACTURE

TECHNICAL FIELD

The present invention relates to a casted concrete stone having opposed parallel molded textured surfaces and the method of manufacture thereof.

BACKGROUND ART

It is known to fabricate concrete stones having a top molded surface that imitates a real stone. Such is done by casting the stone in a mold with dry-cast concrete having a proper amount of humidity and compressed therein by a tamper head of the mold. The tamper head is provided with a textured outer surface resembling a real stone and this is impressed in the top surface of the casted stone as the tamper head applies pressure onto the concrete contained in the mold. The bottom end of the mold is formed by a steel production plate and after casting the stone the mold side walls are lifted about the tamper head and the tamper head is also withdrawn to clear the casted stone. The production plate, with the casted stones, is then brought to a curing station by conveying the production plate to the curing station. The casted stones can also be roughened after they have cured to give it an "aged" look.

It is also known to fabricate casted stones, particularly for the construction of retaining walls and wherein one face of the stone has a rough face consisting of exposed aggregate. This process involves the casting of double stones and after curing these stones they are split along a splitting groove casted on the stone whereby to provide an exposed aggregate surface along the split side walls. This process requires additional machinery and handling of the production plate whereby each double stone can be split and preferably several such stones can be split in one operation. This results in some waste as often the stone will break in an irregular fashion along the split grooves. Accordingly this process is labour-extensive and expensive as it requires machinery, excess floor space and there is waste of material.

Heretofore it has not been possible to cast concrete stones having opposed molded textured surfaces due to the fact that the concrete sticks to the bottom support wall on which the stones are casted, such as the steel production plate. The problem resides in that it is not possible to lift the stones off the production plate as the concrete sticks to it. Accordingly, the freshly casted stones are left there in an undisturbed manner whereby to be cured and then removed from the plate after curing. It has not been possible to cast on a patterned textured bottom support surface as the concrete would stick, at least in part, to the textured surface.

Manufacturers of casted concrete stone also need to carry large inventories of stones as there are stones of different sizes produced for different uses and also these stones need to be manufactured of different colors or tones to resemble different types of real stones. These large inventories also require large storage areas and this adds to the cost. Further, such large inventories are necessary to ensure prompt delivery to customers. Casted concrete stones are also popular for use as exterior walls of buildings as they closely resemble real stone and are easy to install due to the fact that their side surfaces are flat-like bricks, making the installation easier, faster and less costly as compared to real stones which requires expert masons for working the stone to shape and for installation.

SUMMARY OF INVENTION

It is a feature of the present invention to provide a casted concrete stone having opposed molded textured surfaces and a method of manufacture thereof.

It is another feature of the present invention to provide a casted concrete stone having opposed parallel molded textured surfaces with the surfaces being different from one another, either in patterned design, shade or color.

Another feature of the present invention is to provide a casted concrete stone having opposed parallel molded textured surfaces whereby to reduce inventory as one stone can be used with either of its opposed textured surfaces exposed, thus resulting in two-stones-in-one.

Another feature of the present invention is to provide a casted concrete stone having opposed parallel molded textured surfaces for use as a paver whereby the stone can be used with either one of its opposed textured surfaces exposed whereby to create designs or demarcations in driveways, walkways, pool areas, etc.

Another feature of the present invention is to provide a casted concrete stone having opposed parallel molded textured surfaces thereby making it easier for a landscape designer or installer to calculate the quantity of stones required for a landscape design due to the fact that each stone may have two uses in the creation of a design and also provides flexibility to the installer.

Another feature of the present invention is to provide a casted concrete stone having opposed parallel molded textured surfaces formed of different color or shade of concrete.

Another feature of the present invention is to provide a novel method of dry-casting a concrete stone with opposed molded textured surfaces and which requires a single casting operation.

Another feature of the present invention is to provide a method of dry-casting a concrete stone with opposed molded textured surfaces and wherein there is insignificant waste of material in the process.

According to the above features, from a broad aspect, the present invention provides a casted concrete stone having opposed parallel surfaces formed in a mold and wherein the opposed parallel surfaces each have a molded textured surface.

According to a further broad aspect of the present invention there is provided a method of casting a concrete stone with opposed molded textured surfaces. The method comprises the following steps: i) positioning a profiling plate on a support surface, the profiling plate having one or more mold bottom walls each having a textured outer surface; ii) providing a bond release means over said textured outer surface; iii) positioning mold forming side walls about the one or more mold bottom wall formations to form one or more open-top-end molds; iv) filling the one or more open-top-end molds with dry-cast concrete; v) positioning a top plate having one or more mold top wall formations each having a textured outer surface in contact with a top end of the mold forming side walls with the mold top wall formations disposed inside respective ones of the open-top-end molds to close the molds; and vi) compacting the concrete in the molds to form one or more concrete stones having the opposed molded textured surfaces.

BRIEF DESCRIPTION OF DRAWINGS

A preferred embodiment of the present invention will now be described with reference to the accompanying drawings in which:

FIG. 1A is a perspective view of a casted concrete paving stone having opposed molded textured surfaces and formed with the method according to the present invention;

FIG. 1B is a perspective view similar to FIG. 1A but shows the two opposed parallel molded textured surfaces as being unlike molded surfaces and further wherein the stone is casted with two different color pigments in the dry-cast concrete wherein one of the opposed surfaces is of a different tone or color from the other of the opposed textured surfaces;

FIG. 2 is a fragmented end view showing a retaining wall stone constructed in accordance with the present invention wherein the opposed vertical surfaces are molded textured surfaces and wherein the stone can also be fabricated with a section of the stone molded from a concrete having a different shade or colored pigment from the other section whereby to produce opposed molded textured surfaces of different shade or color;

FIG. 3 is a cross-section view of a paver constructed in accordance with the prior art and wherein only one of the surfaces, the top surface, is a molded textured surface;

FIG. 4 is a fragmented perspective view of a prior art retaining wall stone representing prior art stones having an exposed rough aggregate surface formed by splitting the stone along a splitting groove;

FIG. 5A is a simplified side view illustrating an example of the method of the present invention of dry-casting a concrete stone with opposed molded textured surfaces and using a flexible film sheet as the release means;

FIG. 5B is a cross-section view of an open-ended mold formed in the process of the present invention;

FIG. 5C is a cross-section view of a bottom wall formation of the profiling plate wherein the bond release means is a permanent release coating;

FIG. 6 is a simplified view illustrating a step in the process of FIG. 5A;

FIG. 7 is a further simplified view illustrating another step in the process of FIG. 5A;

FIG. 8 is a simplified partly exploded view illustrating the method of the present invention for dry-casting a different type of concrete stone, herein a retaining wall block having opposed molded textured surfaces;

Figure 9A:
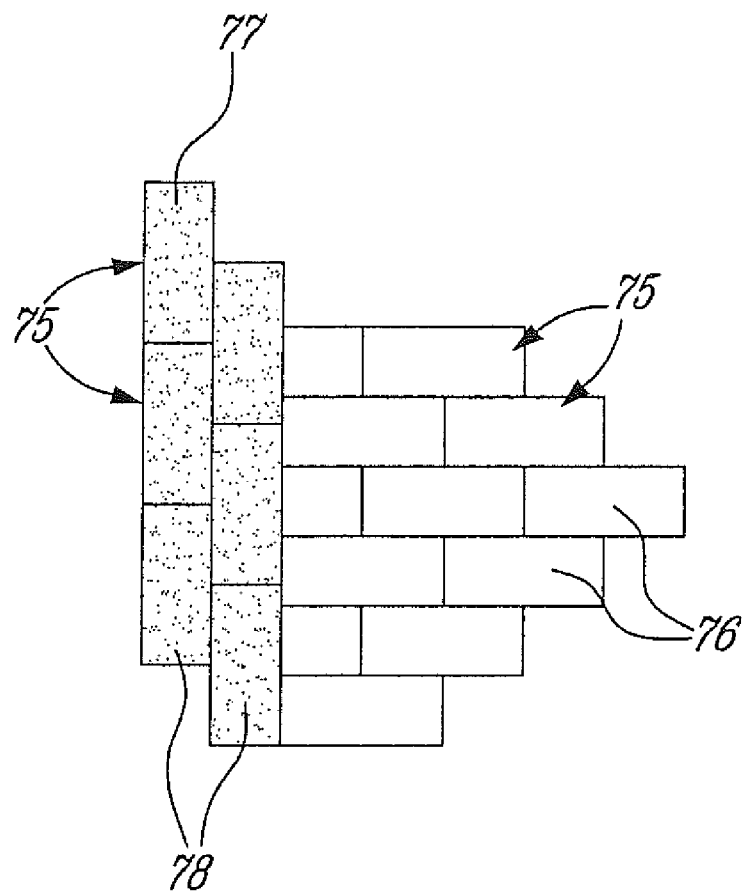
FIG. 9A is a top view showing a casted concrete paving stone fabricated in accordance with the present invention wherein the stone has opposed molded textured surfaces which are different and which are used to create patterns by exposing either ones of the textured surfaces to create delineated paving work as illustrated.

DESCRIPTION OF PREFERRED
EMBODIMENTS

Referring now to FIGS. 1A and 1B, there is shown casted concrete stones 10 and 10' fabricated with the method of casting of the present invention. As hereinshown, the casted concrete stone 10 has opposed textured parallel surfaces, herein surfaces 11 and 11', which have molded textures 12 and 12'. The molded textures in each of the surfaces are preferably different from one another but it could be the same molded texture if there is a need to do so. As shown in FIG. 1B, one of the opposed textured surfaces, herein surface 13, is molded as a generally flat surface with slight depressions 14 forming a flat-like molded texture whereas the opposed surface 13' is similar to the molded texture 12 of FIG. 1A.

As also shown in FIG. 1B, the casted concrete paving stone 10' is casted with a bottom section 15 thereof molded from a first dry-cast concrete mixture having a certain tone or color and wherein the top section 16 is molded in a different dry-cast concrete having a different tone or color. Accordingly, such a stone can be used to create designs in paving surfaces by exposing either one of the textured surfaces to create edging, for example, or any other type of design within a paved surface simply by exposing either one of the textured surfaces of the paving stone. The multi-uses of such a double-sided textured paving stone thus become obvious to a person skilled in the art.

Referring now to FIG. 2, there is shown another type of casted concrete stone, herein a retaining wall block 20 which is casted with opposed parallel vertical surfaces 19 and 19' which are molded textured surfaces. Such stones are usually casted with longitudinal channels or grooves 18 and when stacked one on top of the other are inter-engaged by the use of an insert projecting in opposed aligned grooves of superimposed blocks. Other inter-engaging means are also known to persons skilled in the art using different interconnection means. Again, similar to the example of the stone of FIG. 1B, this block may be casted with dry-cast concrete of different tone or color whereby a section 21 is of a different tone or color from the section 21'.

Heretofore paving stones have been fabricated as shown in FIG. 3 wherein the paving stone 22 has a flat bottom wall 23, flat side walls 24 and a molded textured top surface 25 created by a top shoe plate of each mold. Accordingly, such stones can be used with the top surface 25 only facing upwards. If a pattern of the same stone is to be made with different shade or colored stones, then one would have to calculate the different amounts of stones required for the design pattern and order adequate quantities of each of the required stones. When there are several different types of stones and colors required in a design pattern, this results in more waste as when ordering the stones the installer has to calculate for errors and waste of the material resulting from the installation. With the stone of the present invention, because of its dual use, this waste of material is reduced and the ordering of proper quantities is facilitated. Further, the manufacturer can cut his inventory of that specific stone in half, as that single stone is now equivalent to two different stones.

FIG. 4 illustrates another prior art type of concrete casted stone, herein a wall retaining block 26. As hereinshown the wall retaining block 26 has opposed vertical faces and namely a flat rear face 27 and an aggregate exposed front face 28. These blocks 26 are usually casted as a large double-stone block which is then split in two to form two wall retaining blocks 26, one being shown in FIG. 4. The large block is split along a split groove 29 and by doing so the aggregate 30 in the split concrete face 28 is exposed creating a rough surface resembling a stone. However, that exposed aggregate 30 does not simulate the shape or texture of real stones but merely creates a rough aggregate surface such as is commonly used with standard construction bricks.

Referring now to FIGS. 5 to 7, there will be described the method of dry-casting one or more concrete stones having opposed molded textured surfaces as illustrated in FIGS. 1A and 1B. Dry cast concrete is a concrete mixture which has a low content of water and which is not liquid. Therefore, when reference is made to dry casting, it is meant to cast stones in molds using dry cast concrete which, when compacted and vibrated under pressure, solidifies sufficiently to assume and retain the shape of the mold. FIGS. 5A to 7 are simplified schematic views only to illustrate the novelty in the new process or method of manufacture of the stone of the present invention. As hereinshown, the molding machine consists of a conveying surface, such as a roller conveyor 39, on which there is precisely positioned and retained a steel production plate 40 as is well known in the art. On this steel production plate 40 there is now positioned a profiling plate 41 which has one or more, herein a plurality of mold bottom wall formations 42, having the top face 43 thereof machined to simulate a textured surface of a stone. The steel production plate 40 and the profiling plate 41 are positioned at exact locations by positioning means, not shown, but obvious to a person skilled in the art having knowledge of current stone casting machines.

The profiling plate 41 and its mold bottom wall formations 42 form part of this novel method of casting. Because the mold bottom wall formations 42 are to form the bottom of molds, it is essential that the dry-cast concrete to be casted thereon not stick to its top face 43. In order to achieve this, a bond release means needs to be provided over the top face 43 which has an irregular machined textured surface. One such release means is in the form of a flexible film sheet 44 which is placed over the profiling plate 41 to cover the mold bottom wall formations 42. After the flexible film sheet 44 is placed over the profiling plate to cover the bottom wall formations 42, the mold forming side wall assembly 45 is brought down over the profiling plate 41 with the mold bottom wall formations 42 entering into the open ended mold side wall sections 46. This forms an open top end mold, as shown in cross-section in FIG. 5B, ready to receive dry-cast concrete which is then placed within the open end of this mold assembly over the film sheet 44.

The top plate 47 is provided with one or more, herein a plurality of mold top wall formations 48 which are caused to enter into the open-top-end 46' of the mold side wall sections 46 after they are filled with dry-cast concrete. The hydraulic pistons 49, connected to the top plate 47, now apply pressure onto the dry-cast concrete which has been placed into the mold to compress same. At the same time as the hydraulic pistons apply pressure onto the dry-cast concrete to mold the stones, vibrators 50 are placed in operation whereby to vibrate the molds via the production plate 40, to ensure proper compaction of the dry-cast concrete mixture within the mold to prevent voids in the casted stones.

After the compacting step is complete, the hydraulic pistons 49 will sufficiently retract the top plate 47 and pistons 38 will sufficiently retract the mold forming side wall assembly 45 at the same time to expose the profiling plate 41 and remove the pressure. The pistons 38 and 49 then retract to clear the profiling plate entirely. When the mold forming side wall assembly 45 and top plate has retracted, as shown in FIG. 6, the casted concrete stones 51 are retained within the molds side wall section 46 by friction and suction. As also shown in FIG. 6, the thin plastic film sheet 44 will also retract from the profiling plate 41 as it has some slight adherence to the bottom casted surface 52 of the casted stones 51 which have humidity. This retraction of the top plate 47 and the mold forming side wall assembly 45 is shown in FIG. 6 exaggerated, but is sufficient to create a clearance space 53 to permit the removal of the profiling plate 41 from its support surface, herein the top surface 40' of the steel production plate 40 which remains engaged in position. After the profiling plate 41 is removed, the mold forming side wall assembly 45 is lowered onto the production plate 40 which is now exposed. The pistons 38 then draw up the mold forming side wall assembly about the mold top wall formations 48 (often referred to as shoes) to expose completely the casted stones 51 onto the production plate. The mold top wall formations are also withdrawn with the top plate and the casted concrete stones 51 are thus deposited on the production plate 40.

After the casted concrete stones 51 have been deposited onto the steel production plate 40, as shown in FIG. 7, the steel production plate is conveyed and transported to a curing station 54, such curing stations being well known in the art and wherein the steel plates are held in a storage area provided with racks, spaced apart, one on top of each other and left to cure for a predetermined period of time. It is pointed out that because the flexible film 44 has protected the profiling plate 41 and formed a barrier between the mold bottom wall formations 42 and the concrete, the profiling plate 41 can be reused after cleaning with air pressure to remove any minor debris thereon. The flexible film sheet 44 is adhered to the bottom surfaces 52 of at least some of the casted concrete stones 51 by the humidity in the stones but after the stone dries this film easily releases therefrom. Accordingly, the flexible film sheet 44 is removed from the casted stone only after the stones have cured.

After curing the production plates 40 are conveyed or transported to a packaging station where the flexible film sheet 44 is removed and the casted concrete stones are transferred to a shipping support means, such as pallets for transportation. The flexible film sheet 44 is formed of polyolefin material or any suitable material capable of being used in this process. This film sheet 44 can be retained onto the production plate while the concrete stones are transferred as it is necessary to bring the stones together into contact with one another to form an assembly and then transfer them onto pallets. After the stones are transferred the sheet is discarded for recycling or reused.

Although in the embodiment of FIGS. 5A and 5B the bond release means is illustrated as constituted by a flexible film sheet, the bond release means can be achieved by other means such as providing a permanent Teflon coating 42' on the textured surface of the mold bottom wall formations 42, as shown in FIG. 5C, or spray coating the formations 42 prior to forming the molds with a silicon-based oil, such as a Texaco DEMTAC (Registered Trade Mark), or a wear resistant coating which diffuses nitrogen and carbon into the metal surface, such as MELONITE QPQ (Registered Trade Mark) or other suitable release agent.

FIG. 8 illustrates another type of mold assembly whereby to mold retaining wall blocks 72 with channels 18 in opposed surfaces thereof, as shown in FIG. 2. The vertical mold 60 as hereinshown consists of a profiling plate 61 having mold bottom wall formations 62 provided with a molded texture top surface 63. These formations 62 are precisely contained on the plate 61 for registry with other mold parts. Open-ended mold side wall assembly 64, consisting of side walls 65 and end walls 66, only one being shown herein, which are brought down onto the profiling plate 61 after the thin film sheet 67 or other release means has been provided on the mold bottom wall formations 62. Channel forming fingers 68 are positioned within the mold from openings 68' in the end wall 66 and side walls 65, and are slid out after the stone has been casted. The top plate 69 is provided with a mold top wall formation 70 (or shoe) also having an outer molded textured surface 71. The process of molding the stone is similar to the process of FIG. 5 wherein the mold side wall section 64 is brought down over the profiling plate 61 with the formations 62 entering the mold side walls and a dry-cast concrete mixture is placed within the mold cavity 72 and the top plate brought down to position the top wall formations 70 into the mold to compact the concrete under pressure as the profiling plate is vibrated via the steel production plate on which it is supported or any other support surface to compact the concrete. Because this mold has channel forming fingers 68 projecting into the concrete within the mold, when the mold forming side wall assembly 64 is lifted, the concrete is retained within the mold side walls by these fingers. In order to release the casted concrete block it is first necessary to retract the pins and then the release of the casted concrete stone is effected in the same manner as previously described with reference to FIGS. 5A to 7.

It is to be understood that several mold designs can be provided for the production of dry-casted concrete stones of different shapes and configurations in accordance with the present invention. The novelty of the method of the present invention is to make it possible to cast concrete stones with opposed molded textured surfaces and this has been accomplished by the use of the combination of the profiling plate design and the flexible film sheet or other bond release means.

FIG. 9A illustrates a use of a concrete casted paving stone of the type shown in FIGS. 1A and 1B. By the use of a single stone 75 having opposed molded textured surfaces 76 and 77 which are of different texture, tone, or color, it is possible to create various designs in paved areas. As hereinshown, the surface 76 represents part of a driveway or walkway surface which is delineated on the sides by two rows 78 of the same stone 75 but exposing the opposed surface 77 which is different to form an edging demarcation. This is accomplished by the use of a single stone.

Figure 9B:
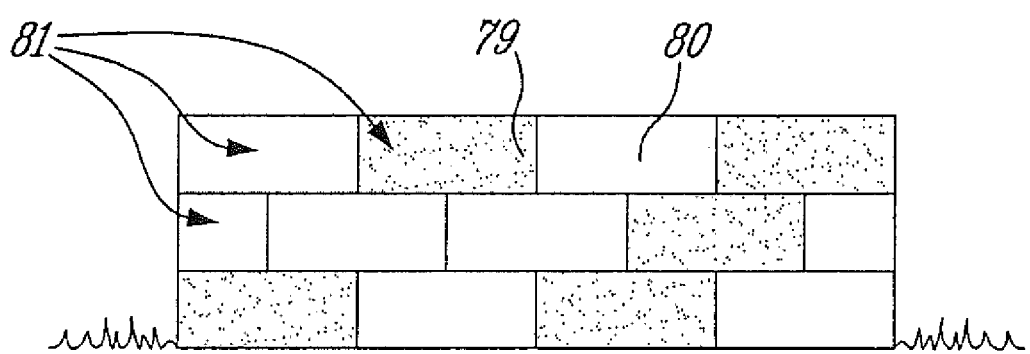
FIG. 9B is a side view of a retaining wall constructed with casted concrete wall retaining blocks and wherein the opposed surfaces are molded textured surfaces with the blocks having either ones of their textured surfaces exposed to create a pattern.

FIG. 9B illustrates the construction of a retaining wall using blocks similar to those as shown in FIG. 2 and wherein both of the molded textured surfaces 79 and 80 of the stones 81 are mixed to create a design or pattern. Further, because these stones have opposed molded textured surfaces, a free-standing wall can be constructed with both of the opposed faces having a "real stone" appearance and being exposed. Therefore, separation walls which are visible from both sides can be fabricated.

With the method of manufacture, it is also possible to mold stones with two different dry-cast concrete mixtures containing different color pigments. This is accomplished by placing one mixture in the bottom portion of the mold and the other mixture in the top portion of the mold whereby the opposed molded surfaces have a different tone or color as well as a different texture. For example, the stone could be produced with a dark grey color on one side and a lighter grey color on the other side so that the same overall color is retained while providing for the stone to be exposed from either of its sides to create different tones of a color in an exposed stone wall or paved surface. By doing so, instead of producing stones of two different colors, as is the case with the prior art, this single stone would achieve the same result while reducing the inventory by half.

It is within the ambit of the present invention to cover any obvious modifications of the preferred embodiment of the casted concrete stones and the method of fabrication, provided such modifications fall within the scope of the appended claims.

The invention claimed is:

1. A method of casting a concrete stone with opposed molded textured surfaces, said method comprising the steps:
    i) positioning a profiling plate on a support surface, said profiling plate having one or more mold bottom wall formations each having a textured outer surface;
    ii) providing a bond release means over said textured outer surface;
    iii) positioning mold forming side walls about said one or more mold bottom wall formations to form one or more open-top-end molds;
    iv) filling said one or more open-top-end molds with dry-cast concrete;
    v) positioning a top plate having one or more mold top wall formations each having a textured outer surface in contact with an entire top end of said mold forming side walls with said mold top wall formations disposed inside respective ones of said open-top-end molds to close said molds;
    vi) compacting said concrete in said molds to form one or more concrete stones having said opposed molded textured surfaces; and
    vii) separating said mold forming side wall and said top plate with said concrete compacted in said mold from said profiling plate for the re-use of said profiling plate.

2. A method as claimed in claim 1 wherein said step (vi) comprises compacting said concrete by applying pressure on said top plate to cause said mold top wall sections to compress said concrete, and wherein there is further provided the step of vibrating said molds as said concrete is compacted by pressure applied by said top plate.

3. A method as claimed in claim 2 wherein said step (ii) comprises placing a flexible film sheet over said textured outer surface of said mold bottom wall formations, said flexible sheet being adhered at least in part to a bottom one of said opposed molded textured surfaces by humidity in said concrete.

4. A method as claimed in claim 3, wherein said step (vii) lifting said top plate a predetermined distance and lifting said mold forming side walls a predetermined distance to separate said one or more concrete stones from said profiling plate, and removing said profiling plate from under said mold forming side walls.

5. A method as claimed in claim 4 wherein in said step of lifting said mold forming side walls there is further provided the step of removing said film sheet from said bottom surfaces to expose a textured bottom surface of said one or more concrete stones formed by said textured profiled top surface of said mold bottom wall sections of said profiling plate.

6. A method as claimed in claim 4 wherein said step of lifting said mold forming side walls further comprises retaining said concrete stones in said mold forming side walls by friction of said one or more concrete stones with an inner surface of said mold forming side walls or by channel forming fingers extending into said mold forming side walls and edge walls of said one or more concrete stones.

7. A method as claimed in claim 4 wherein after said step of removing said profiling plate from under said mold forming side walls there is provided the step of depositing said one or more concrete stones on said support surface with said film sheet extending over said bottom surface of said one or more concrete stones, and conveying said concrete stones to a curing station.

8. A method as claimed in claim 7 wherein said support surface is a top surface of a production plate, said production plate with said concrete blocks and film sheet being conveyed to said curing station.

9. A method as claimed in claim 8 wherein after curing there is provided the step of conveying said production plate to a packaging station where said film sheet is removed and said concrete stones are transferred to a transport support means.

10. A method as claimed in claim 9 wherein said film sheet is a thin film sheet of polyolefin material, said film sheet being retained on said production plate while said concrete stones are transferred to said transport support means, and thereafter released to be removed from said production plate.

11. A method as claimed in claim 1 wherein after step (iii) there is further provided the step of actuating profiled fingers in said mold forming side walls to form channel profiles in opposed non-textured surfaces of said mold, and withdrawing said profiled fingers from said mold forming side walls after said mold forming side walls with said one or more concrete stones are brought down on said support surface, and lifting said mold forming side walls with said one or more concrete stones released therefrom and supported on said support surface.

12. A method as claimed in claim 1 wherein said step (iv) comprises the steps of filling a bottom portion of said open-top-end molds with dry-cast concrete of a first color or tone and filling a top portion of said open-top-end molds with a dry-cast concrete of a second color or tone whereby to cast said one or more concrete stones with said opposed molded textured surfaces being of different color or tone.

13. A method as claimed in claim 1 wherein said step (ii) comprises forming said textured outer surface of said mold bottom wall formations with a permanent, non-stick, release coating to prevent said dry-cast concrete from sticking thereto.

14. A method as claimed in claim 1 wherein said step (ii) comprises spraying said textured outer surface of said mold bottom wall formations with a silicon-based oil to prevent said dry-cast concrete from sticking thereto.

* * * * *